United States Patent
Kelder

[11] Patent Number: 5,948,565
[45] Date of Patent: Sep. 7, 1999

[54] CATHODE MATERIAL FOR LITHIUM SECONDARY BATTERIES AND A PROCESS AND A PRECURSOR MATERIAL FOR THE PRODUCTION THEREOF

[75] Inventor: Erik Maria Kelder, Nootdorp, Netherlands

[73] Assignee: Danionics A/S, Odense, Denmark

[21] Appl. No.: 08/765,124

[22] PCT Filed: Jun. 9, 1995

[86] PCT No.: PCT/DK95/00232

§ 371 Date: Feb. 14, 1997

§ 102(e) Date: Feb. 14, 1997

[87] PCT Pub. No.: WO95/34919

PCT Pub. Date: Dec. 21, 1995

[30] Foreign Application Priority Data

Jun. 10, 1994 [DK] Denmark .................................. 0663/94

[51] Int. Cl.[6] .................................................. H01M 4/50
[52] U.S. Cl. ......................... 429/224; 429/231.1; 423/49
[58] Field of Search .............................. 429/224, 231.1; 423/49, 50, 593

[56] References Cited

U.S. PATENT DOCUMENTS

| | | | |
|---|---|---|---|
| 5,135,732 | 8/1992 | Barboux et al. | 423/593 |
| 5,316,877 | 5/1994 | Thackeray et al. | 429/197 |
| 5,370,948 | 12/1994 | Hasegawa et al. | 429/223 |
| 5,770,018 | 6/1998 | Saidi | 204/157.15 |
| 5,783,332 | 7/1998 | Amine et al. | 429/218 |

FOREIGN PATENT DOCUMENTS 04-694468 9/1992 Japan ............................ H01M 10/40

OTHER PUBLICATIONS

Miyamoto et al., "Synthesis of lithium manganese oxide . . ." Denki Kagaku oyobi Kogyo Butsuri Kagaku, 61 (10), 1222–3. (No month available), 1993.

Cullity, "Elements of X–Ray Diffraction", second edition, Addison–Wesley, pp. 377–379. (No month available.), 1978.

*Primary Examiner*—Maria Nuzzolillo
*Assistant Examiner*—Carol Chaney
*Attorney, Agent, or Firm*—Darby & Darby

[57] ABSTRACT

A process is disclosed for the preparation of lithium secondary battery cathode active materials which are of the form $Li_yMn_{2-z}M_zO_4$ where M is selected from the group consisting of Co, Ni, Ti, V and Fe, y is in the range from 0 to 1.5 and z is in the range from 0 to 1. The process comprises forming a melt or saturated solution from manganese acetate, lithium hydroxide and water, keeping the melt/solution at a temperature in the range of 70 to 110° C. for a period of from 10 minutes to 4 hours under stirring so as to form an essentially homogeneous material, and drying said material followed by calcination at a temperature in the range of 300 to 800° C.

20 Claims, 5 Drawing Sheets

CATHODE MATERIAL FOR LITHIUM SECONDARY BATTERIES AND A PROCESS AND A PRECURSOR MATERIAL FOR THE PRODUCTION THEREOF

The present invention concerns a spinel lithium manganese oxide based cathode material for lithium secondary batteries and a process and a precursor material for the production.

The use of spinel $Li_{1+x}Mn_2O_4$ cathode material in lithium secondary batteries is well known in the art and e.g. described in Thackeray et al.: "Lithium Insertion Into Manganese Spinels", Mat. Res. Bull., 18, pp. 461–472 (1983).

Spinel $Li_{1+x}Mn_2O_4$ has proven to be a highly suited material for the construction of cathodes for high voltage lithium secondary batteries. There exists, however, still a need for an improvement of the lithium chemical diffusion coefficient of such materials.

It is an object of the present invention to provide a cathode material for lithium secondary batteries which exhibits a higher lithium chemical diffusion coefficient than otherwise obtained for pure spinel $Li_{1+x}Mn_2O_4$.

This object is accomplished by a cathode material for lithium secondary batteries containing as active ingredient $Li_yMn_{2-z}M_zO_4$ in which M is selected from the group consisting of Co, Ni, Ti, V, Fe, in which y is in the range from 0 to 1.5, preferably 1 to 1.5, and in which z is in the range from 0 to 1 and furthermore comprising 1 to 50% by mole of the inactive cathode material $\alpha$-$Mn_2O_3$ and/or $Li_2MnO_3$.

In the present context the expression "active ingredient" refers to a material that, when used as a cathode material in a battery, is capable of being oxidized and reduced in a reversible manner during charge and discharge of the battery. The expression "inactive cathode material" refers to any other material than the active ingredients defined above.

The content of $\alpha$-$Mn_2O_3$ and/or $Li_2MnO_3$ is preferably chosen in the range where maximum improvement in lithium chemical diffusion coefficient is obtained. However, the content of these inactive materials should not be too high, since in that case a reduction in battery energy density may be observed.

Thus, the cathode material according to the invention contains 1 to 50% by mole, preferably 1 to 40% by mole and more preferably 3 to 30% by mole of $\alpha$-$Mn_2O_3$ and/or $Li_2MnO_3$.

Figure 5:
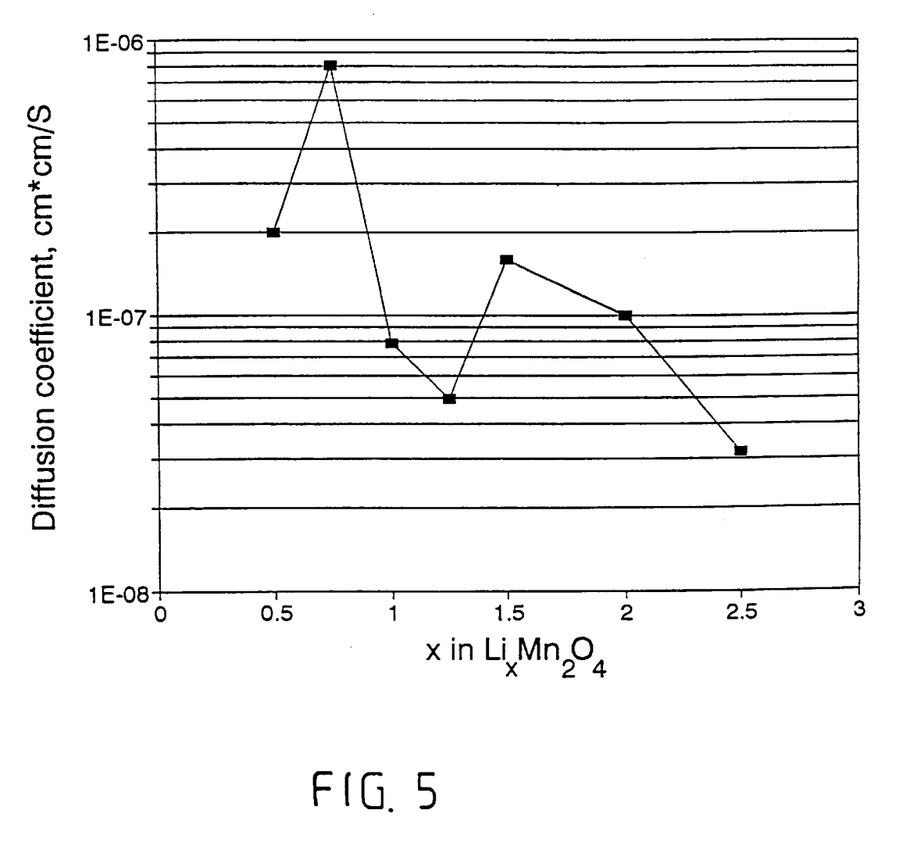
FIG. 5 is a graph showing the dependence of the lithium chemical diffusion coefficient on the nominal lithium concentration x.

At about 25 mole-% of $\alpha$-$Mn_2O_3$ along with $LiMn_2O_4$ and at about 25% of $Li_2MnO_3$ along with $Li_{1.5}Mn_2O_4$ maxima are obtained on the lithium chemical diffusion coefficient curve as can be seen in FIG. 5.

The lithium chemical diffusion coefficient is surprisingly remarkably improved in the instance where the cathode material according to the invention contains about 25 mole-% of $\alpha$-$Mn_2O_3$ and/or $Li_2MnO_3$.

Several methods for the production of spinel lithium $Mn_2O_4$ materials are known in the art:

Thus, Mat. Res. Bull., 18, pp. 461–472 (1983) describes preparation of $Li_{1+x}Mn_2O_4$ wherein x=0.96 to 1.24 by calcining a mixture of solid $LiCO_3$ and $Mn_2O_3$, first at a temperature of 650° C. for 12 hours and then at 850° C. for 24 hours.

U.S. Pat. No. 5,266,299 describes preparation of $Li_{1+x}Mn_2O_4$ in which 0<x<1 by reacting a mixture of $LiMn_2O_4$ or $\lambda$-$Mn_2O_3$ with LiI in a sealed container at about 150° C. or with reflux in acetonitrile.

U.S. Pat No. 4,980,251 describes preparation of $Li_{1-x}Mn_2O_4$ in which 0<x<1 by heating a mixture of $Li_2CO_3$ and $MnCO_3$ to a temperature in the range of 200 to 600° C.

A process for synthesising cathode material for lithium secondary batteries using manganese acetate as starting material is described in Barboux et al.: "The Use of Acetates as Precursors of the Low-Temperature Synthesis of $LiMn_2O_4$ and $LiCoO_2$ intercalation Compounds", Jour. Solid State Chem., 94, pp. 185–96 (1991) and in U.S. Pat. No. 5,135,732 to Barboux et al. In this process a gelatinous precipitate is formed from a dilute aqueous solution of manganese acetate, lithium hydroxide and ammonium hydroxide. Then the precipitate is dried at a temperature of up to 150° C. and annealed at a temperature in the range of 200 to 600° C.

The above-referenced known methods for preparation of spinel $LiMn_2O_4$ involve either complex solid state synthesis or require a high degree of aqueous dilution of the starting materials and inert atmospheres for protection of the solutions against oxidation. The known methods are either slow or very expensive and thus not suited for production on a large scale.

It is thus a further object of the present invention to provide a process for the preparation of a cathode material for lithium secondary batteries containing as its active ingredient $Li_yMn_{2-z}M_zO_4$ in which M is selected from the group consisting of Co, Ni, Ti, V, Fe, in which y is in the range 0 to 1.5, preferably 1 to 1.5, and in which z is in the range 0 to 1, which process is economically advantageous and easy to perform on an industrial scale.

This object is accomplished by a process for the production of a cathode material for lithium secondary batteries that comprises the steps of forming a melt or a highly concentrated aqueous solution from the following components:
(a) manganese acetate tetrahydrate,
(b) lithium hydroxide,
(c) water, and optionally
(d) an acetate of Co, Ni, Ti, V or Fe, where the molar ratios (a):(b)=1:0 to 1:1.5, (a):(c)=1:0 to 1:3, preferably 1:0 to 1:2, and (a):(d)=1:0 to 1:1, keeping the melt or highly concentrated aqueous solution at a temperaure in the range of 70 to 110° C. for a period of from 10 minutes to 4 hours under stirring so as to form an essentially homogeneous material, and drying said material followed by calcination at a temperature in the range of 300 to 800° C.

The content of Li in the produced spinel lithium manganese oxide may be adjusted by common electrochemically methods such as a battery charging process.

The water to metal ratio used during the proces of the present invention is at least 10 times lower than e.g. the method of Barboux. This means that the complex and time consuming step of removing water is avoided and thereby it is much faster and very energy saving.

The purpose of the relatively small amount of water which is used in accordance with the process of the invention, is in fact only to break up the crystals of $Mn(C_2H_3OO)_2 \cdot 4H_2O$, since it is not possible to dissolve it into its own crystal water, as is commonly known for the similar compound $NaC_2H_3OO \cdot 3H_2O$.

It is preferred that all the $Mn(C_2H_3OO)_2 \cdot 4H_2O$ crystals are dissolved before adding lithium hydroxide. $LiOH \cdot H_2O$ is the preferred lithium hydroxide. Instead of $LiOH \cdot H_2O$, dry LiOH can also be used, but due to its hygroscopic behaviour, the water content, and hence the lithium content of dry LiOH, is difficult to determine by simple weighing.

During the preparation of the melt or solution there is no requirement to protect it against oxygen.

If the melt or solution is prepared in a vessel without a lid, the formation of the desired homogeneous slurry after adding LiOH·H$_2$O will take about 5 times longer than in the closed system. However the quality of the final product is not influenced.

If the slurry is cooled to room temperature, it becomes an amorphous yellow-brown solid, which is referred to as a gel. Ageing of this solid results in further oxidation of available Mn$^{2+}$, resulting in a dark brown solid. However, this ageing effect does not effect the result of the following calcining step. The solid precursor material can be liquefied easily by heating it again. The cycling of solidifying and liquefying can be repeated several times without affecting the following calcining step.

During the process, the liquid is coloured from light pink (Mn(C$_2$H$_3$OO)$_2$·4H$_2$O) to yellow-brown. This colouring is caused by oxidation of Mn$^{2+}$ to Mn$^{3+}$ the latter being brown. In fact, the colouring already starts before adding any LiOH·H$_2$O.

It is an advantage of the process according to the present invention that the produced cathode has a substantially finer particle size than that obtained when using the calcining step of a dry mixture of solid lithium salts and manganese salts according to prior art.

The primary particle size as determined by SEM increases from 0.2 to 1 μm as a function of the calcining temperature in the temperature region of 300 to 800° C.

According to the present invention the cathode material for a lithium secondary battery is preferably a powder with a primary particle size not exceeding 1 μm and a specific surface area which is suitable to the application.

Figure 1:
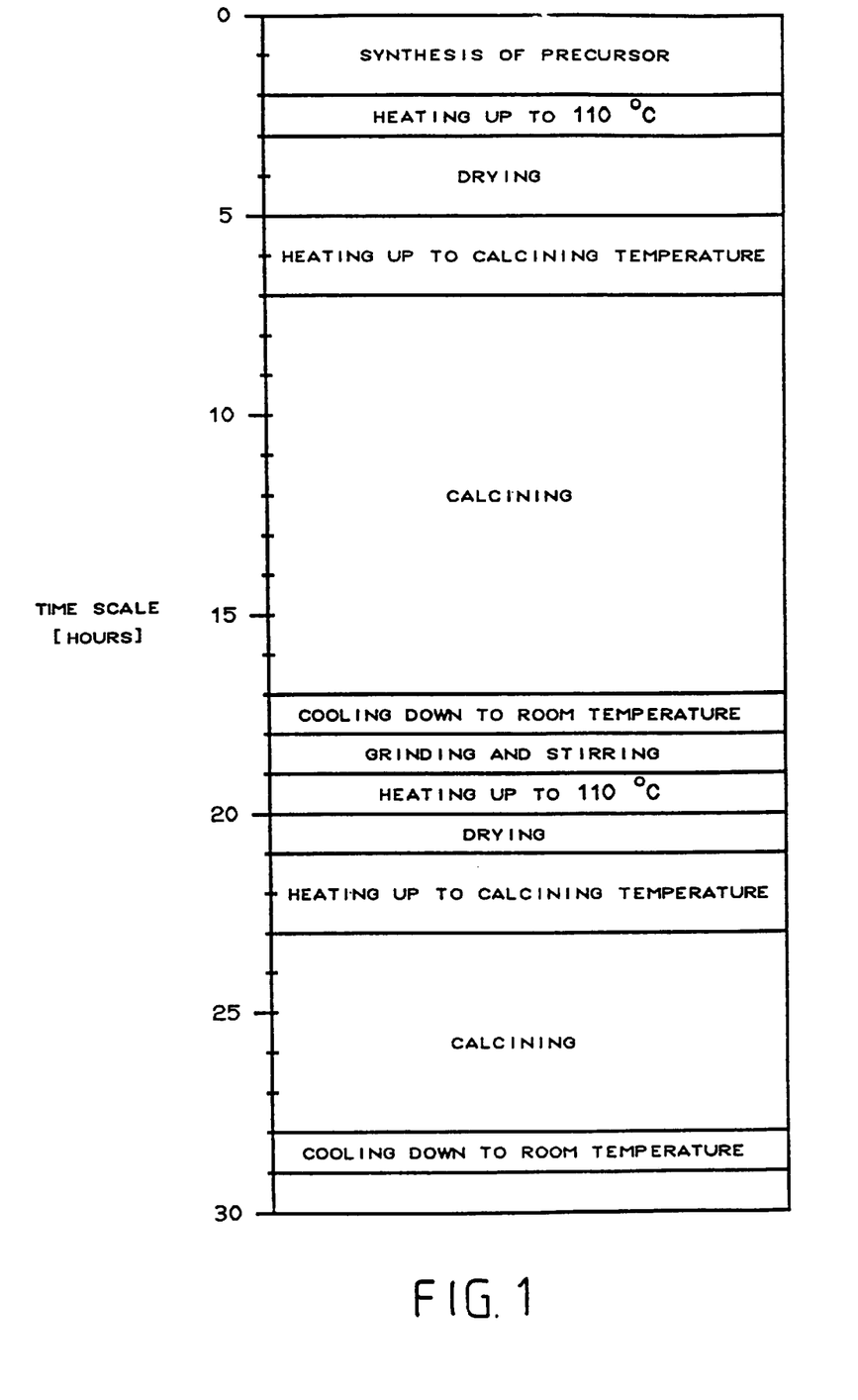
FIG. 1 shows the overall time scale of the synthesis method, using the calcining temperature of 600° C.

The overall time for one preparation run becomes less than 20 hours, if a calcining step of 600° C. is used (see also FIG. 1). If a second calcination takes place, the process time is less than 30 hours.

The process of the invention is advantageous for the preparation of lithium manganese oxide cathode materials incorporating transitional metal atoms other than manganese such as Co, Ni, Ti, V and Fe in the crystal structure. Incorporation of additional transitional metals, normally referred to as "doping", may tailor the change of stability of crystal structure and provide active sites according to specific needs.

In a preferred embodiment of the invention the melt or highly concentrated aqueous solution is formed by first dissolving manganese acetate tetrahydrate and optionally an acetate of Co, Ni, Ti, V or Fe in boiling water followed by introduction of lithiumhydroxide to the solution.

During the process of the invention the melt or highly concentrated aqueous solution is preferably kept at a temperature in the range of 80 to 100° C. for a period of 10 minutes to 4 hours.

It has been found the homogeneity of product obtained by the process of the invention can be markedly improved by subjecting it to a post-treatment process consisting of the steps of wet grinding, drying and calcination. The calcination is preferably carried out for a period of from 5 to 24 hours.

In a special embodiment of the process according to the invention a cathode material is produced by forming a melt or a highly concentrated aqueous solution from the following components:

(a) manganese acetate tetrahydrate,
(b) lithium ihydroxide, and
(c) water, where the molar ratio (a):(b)=1:0 to 1:1.5 and the amount of water approximately corresponds to the smallest amount of water sufficient to dissolve (a) and (b) at a temperature of approximately 100° C., keeping the melt or highly concentrated aqueous solution at a temperaure in the range of 70 to 110° C. for a period of from 10 minutes to 4 hours under stirring so as to form an essentially homogeneous material, and
drying said material followed by calcination at a temperature in the range of 300 to 800° C.

This embodiment results in a cathode material having the nominal formula Li$_x$Mn$_2$O$_4$ where 0<x<3.0, x being twice the nominal Li/Mn ratio of the starting materials (b) and (a). The cathode material is essentially composed of a mixture of the active cathode material Li$_y$Mn$_2$O$_4$ (1.0<y<1.5) and at least one of the inactive cathode materials αMn$_2$O$_3$ and Li$_2$MnO$_3$. The relative proportions of these three cathode material constituents depends on the proportions of the starting materials.

The present invention furthermore relates to the material which is formed by carrying out the process of the invention except from the drying and calcination steps, said material constituting a precursor for the production of the cathode material according the invention.

It has been found that this precursor material does not reqire protection against oxygen and that it readily can be liquefied whereby material handling is simplified. The cathode material according to the invention can easily be produced from the precursor material by subjecting it to drying and calcination.

The invention will be described in detail in the following referring inter alia to the drawing, in which.

Figure 2:
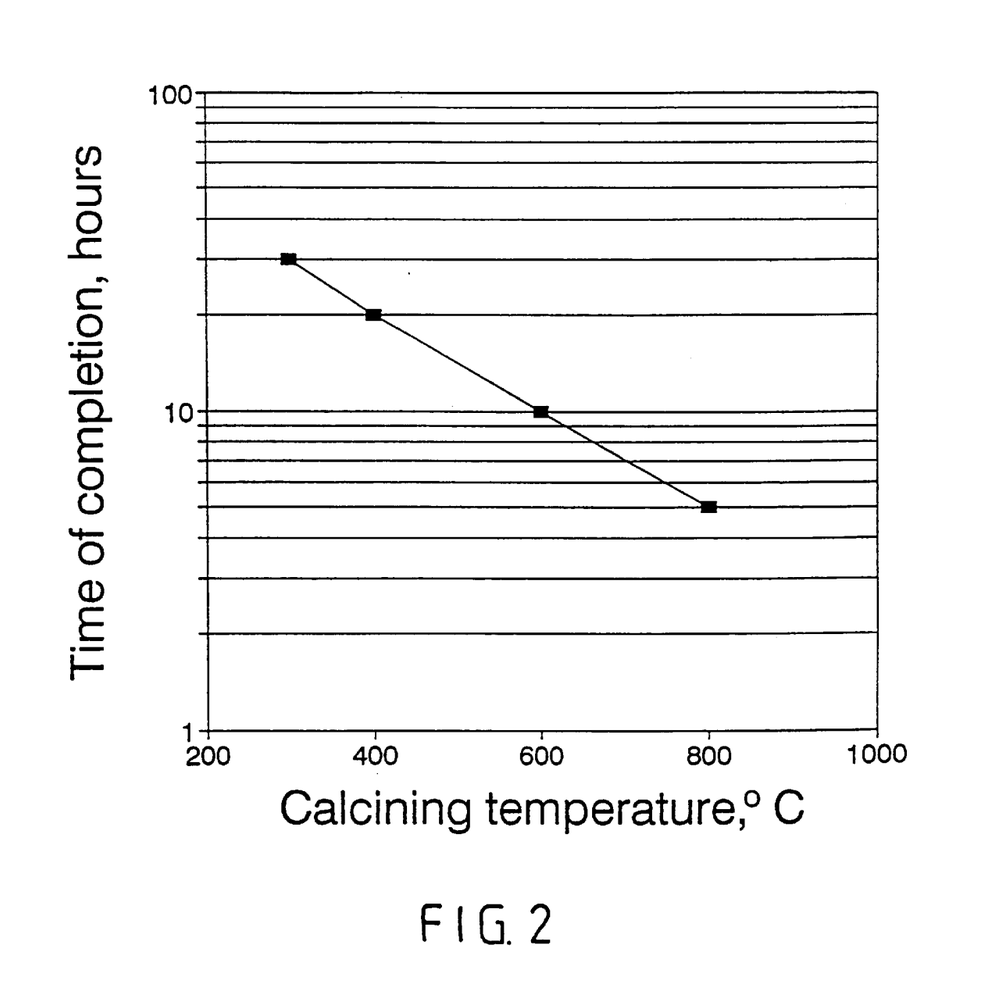
FIG. 2 is a graph showing the dependence of the average minimum time needed to complete the reaction on the calcining temperature.

The completion of the reaction is determined using infrared spectroscopy taking samples during calcining at regular time intervals (Fig.2).

Figure 3:
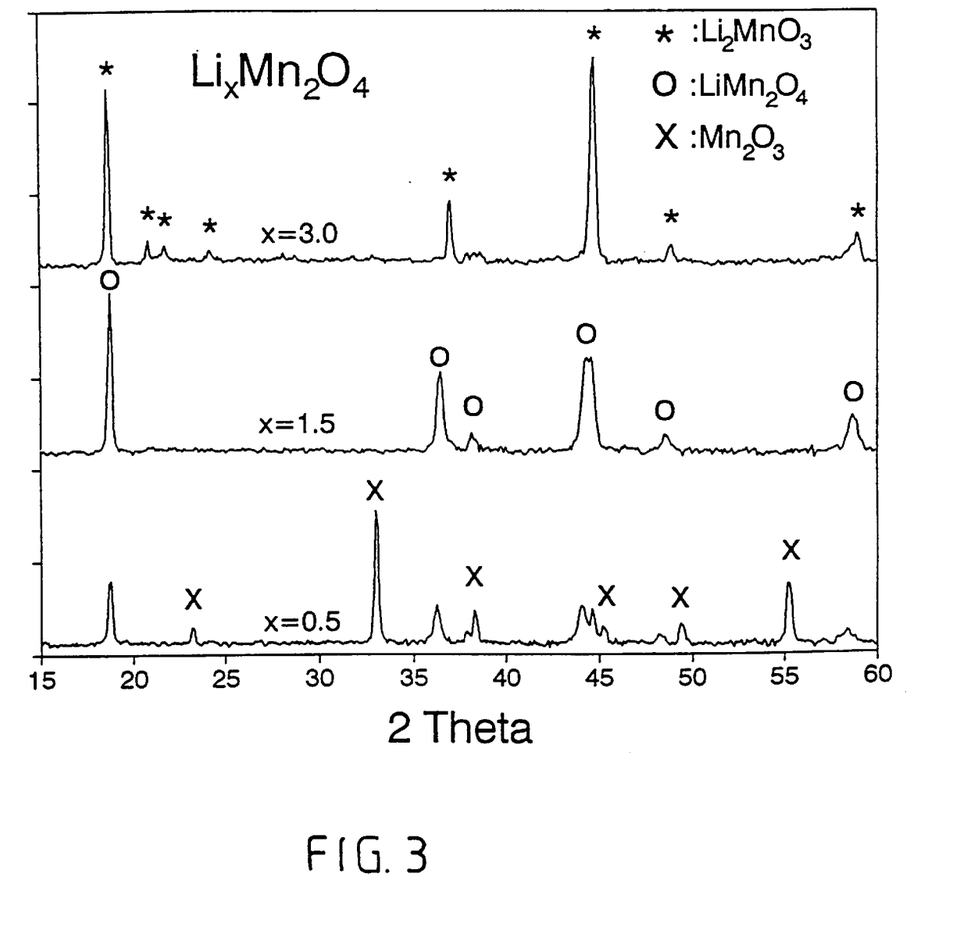
FIG. 3 is a graph showing the XRD-patterns of several obtained samples with different nominal compositions.

The crystal phases and mixtures are determined using x-ray diffraction (XRD). The X-ray diffraction (XRD) patterns of powders with several x-values calcined in air at 600° C. are shown in FIG. 3. It appears that at this calcining temperature 3 different phase regions occur as a function of the x-value. The major components of these 3 regions are:

(i) a mixture of α-Mn$_2$O$_3$ and LiMn$_2$O$_4$ for 0<x<1,
(ii) Li$_y$Mn$_2$O$_4$ (1.0<y<1.5) for 1.0<x<1.5, and
(iii) a mixture of Li$_y$Mn$_2$O$_4$ and Li$_2$MnO$_3$ for 1.5<x<3.0.

Results of powders calcined in air at 400° C. using appropriate calcining times reveal that even a y-value below 1.0 is obtainable.

Figure 4:
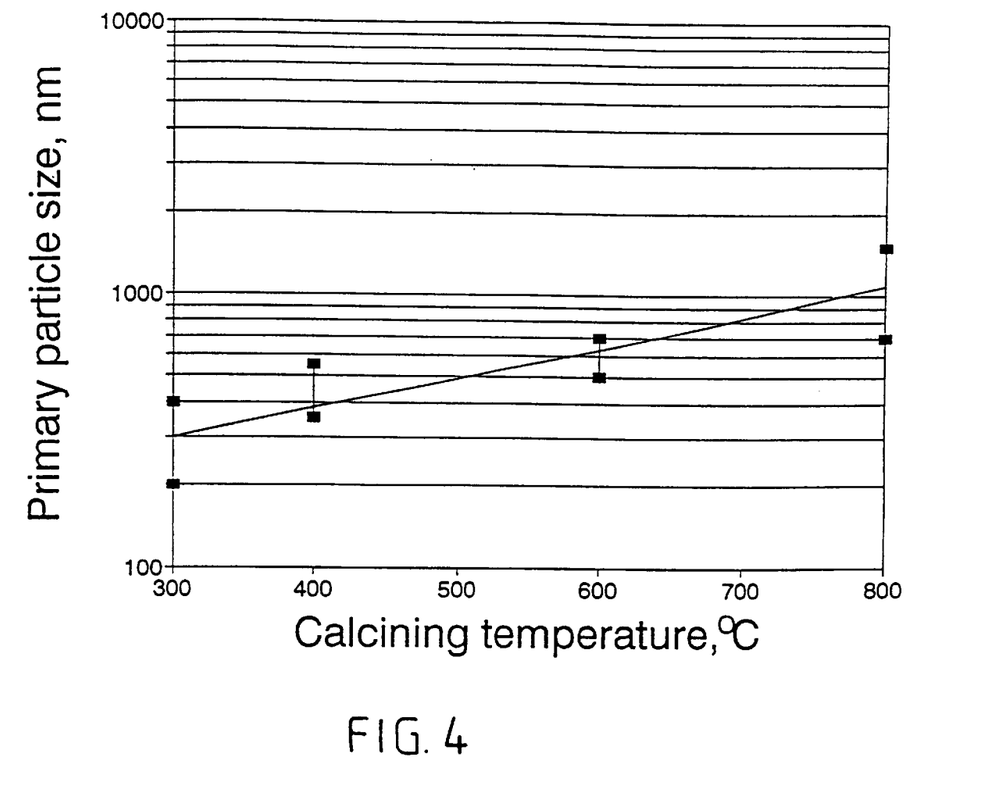
FIG. 4 is a graph showing the dependence of the primary particle size on the calcining temperature.

The primary particle size of the powders depends on the calcining step as shown in FIG. 4. The primary particle size was determined using a scanning electron microscope (SEM). According to this Figure, the process of present invention results in a product having a primary particle size which never exceeds 1 μm even at calcining temperatures up to 800° C.

The lithium chemical diffusion coefficient is measured by the galvanostatic intermittent titration technique (GITT). This property is studied in an electrochemical cell which comprises: Li/1M LiAsF$_6$ in PC+DME/Li$_x$Mn$_2$O$_4$. This cell based on propylene carbonate and dimethoxyethane is well known in the art. The results are given in FIG. 5.

In the following examples preparation of cathode materials according to the invention is illustrated.

EXAMPLE 1

In a vessel, 200 g of $Mn(C_2H_3OO)_2 \cdot 4H_2O$ is dissolved in 20 ml of preboiled distilled water at about 100° C. under vigorous stirring. The vessel is covered with a lid to prevent the solution from drying during this stage. The liquid material obtained is commonly known as a melt. To this melt 20 g of $LiOH \cdot H_2O$ is added in one portion, forming initially a mixture of cloudy white lumps. These lumps disappear completely after 1 hour of vigorously stirring. The melt is kept at a temperature of about 100° C. for 2 hours and is then cooled to room temperature, whereby an amorphous yellow-brown gel precipitates, which gel is the precursor for the production of the cathode material.

The precursor material is dried in air at 110° C. for 2 hours after which it is calcined in air for 10 hours at a temperature of 600° C. in a covered alumina crucible. After this calcining step the new solid formed is allowed to cool down very rapidly. The yield is almost 100%. The solid is ground and used in accordance with the state of the art as a cathode material.

EXAMPLE 2

50 g of a product prepared as described in Example 1 and containing visible inhomogeneties (red-colored grains) was ground in order to break up agglomerates. To this ground powder, 10 ml of preboiled distilled water was added leaving just a small film of water on it. Water was added to prevent a dusty smoke of powder during the handling of this material and to improve the homogeneity of the powder. This mixture of powder and water was stirred vigorously, dried for one hour in air at 110° C. and calcined in air in a covered alumina crucible at the same calcining temperature as used in the calcining step of Example 1 and during half the time used in said calcining step. Then the powder was allowed to cool down very rapidly. The homogeneity of the product obtained was clearly improved, as evidenced by visual inspection.

EXAMPLE 3

Proceeding as in Example 1, 5 g of $Fe(C_2H_3OO)_2 \cdot 4H_2O$ was used to replace 5 g of the 200 g portion of $Mn(C_2H_3OO)_2 \cdot 4H_2O$. The gross physical properties of the product obtained were very similar to those of the product obtained in Example 1, and X-ray diffraction graphs clearly showed that even though incorporation of the Fe atoms into the mixture of crystals had taken place, the spinel structure was preserved. The gross chemical formula of the compound obtained was $Li_{1.10}Mn_{1.90}Fe_{0.10}O_4$.

EXAMPLE 4

Proceeding as in Example 1, 5 g of $Co(C_2H_3OO)2 \cdot 4H2O$ was used to replace 5 g of the 200 g portion of $Mn(C_2H_3OO)_2 \cdot 4H_2O$. The gross physical properties of the product obtained were very similar to those of the product obtained in Example 1, and x-ray diffraction graphs clearly showed that even though incorporation of the Co atoms into the mixture of crystals had taken place, the spinel structure was preserved. The gross chemical formula of the compound obtained was $Li_{1.10}Mn_{1.90}Co_{0.10}O_4$.

I claim:

1. A process for the production of a cathode material containing as an active ingredient $Li_yMn_{2-z}M_zO_4$ in which M is selected from the group consisting of Co, Ni, Ti, V and Fe; y is in the range from 0 to 1.5; and z is in the range from 0 to 1 which comprises the steps of
    (i) forming a melt or a saturated aqueous solution from the following components:
        (a) manganese acetate tetrahydrate,
        (b) lithium hydroxide,
        (c) water, and optionally
        (d) an acetate of Co, Ni, Ti, V or Fe,
    where the molar ratios (a):(b)=1:0 to 1:1.5, (a):(c)=1:0 to 1:3, and (a):(d)=1:0 to 1:1;
    (ii) keeping the melt or saturated aqueous solution at a temperature in the range of 70 to 110° C. for a period of from 10 minutes to 4 hours under stirring so as to form an essentially homogeneous material;
    (iii) drying said material; and
    (iv) calcining said material at a temperature in the range of 300 to 800° C.

2. A process for the production of a cathode material containing as an active ingredient $Li_yMn_{2-z}M_zO_4$ in which M is selected from the group consisting of Co, Ni, Ti, V, and Fe; y is in the range from 0 to 1.5; and z is in the range from 0 to 1; which comprises the steps of
    (i) forming a melt or a saturated aqueous solution from the following components:
        (a) manganese acetate tetrahydrate,
        (b) lithium hydroxide,
        (c) water, and optionally
        (d) an acetate of Co, Ni, Ti, V or Fe,
    where the molar ratios (a):(b)=1:0 to 1:1.5, (a):(c)=1:0 to 1:3, and (a):(d)=1:0 to 1.1 and the proportion of the starting materials is selected so as to result in a cathode material comprising 1 to 50% by mole of the inactive cathode materials $\alpha Mn_2O_3$, $Li_2MnO_3$, and mixtures thereof;
    (iii) keeping the melt or saturated aqueous solution at a temperature in the range from 70 to 110° C. for a period of time of from 10 minutes to 4 hours under stirring so as to form an essentially homogeneous material;
    (iv) drying said material; and
    (v) calcining said material at a temperature in the range from 300 to 800° C.

3. A process according to claim 1, wherein the melt or saturated aqueous solution is formed by first dissolving said manganese acetate tetrahydrate and optionally said acetate of Co, Ni, Ti, V or Fe in boiling water followed by introduction of said lithium hydroxide to the solution.

4. A precursor material for the production of a cathode for lithium secondary batteries containing as an active ingredient $Li_yMn_{2-z}M_zO_4$ in which M is selected from the group consisting of Co, Ni, Ti, V, and Fe; y is in the range from 0 to 1.5; and z is in the range from 0 to 1; which has been prepared by a process which comprises the steps of
    (i) forming a melt or a saturated aqueous solution from the following components:
        (a) manganese acetate tetrahydrate,
        (b) lithium hydroxide,
        (c) water, and optionally
        (d) an acetate of Co, Ni, Ti, V or Fe,
    where the molar ratios (a):(b)=1:0 to 1:1.5, (a):(c)=1:0 to 1:3, and (a):(d)=1:0 to 1:1;
    (ii) keeping the melt or saturated aqueous solution at a temperature in the range of 70 to 110° C. for a period of from 10 minutes to 4 hours under stirring so as to form an essentially homogeneous material.

5. A precursor material for the production of a cathode material for lithium secondary batteries containing as an active ingredient $Li_yMn_{2-z}M_zO_4$ in which M is selected from the group consisting of Co, Ni, Ti, V, and Fe; y is in the range from 0 to 1.5; and z is in the range from 0 to 1 and comprising from 1 to 50% by mole of the inactive cathode materials $\alpha Mn_2O_3$, $Li_2MnO_3$ and mixtures thereof, which is prepared by performing a process according to steps (i) and (ii) of claim 4.

6. A process according to claim 1, wherein y is in the range from 1 to 1.5.

7. A process according to claim 1, wherein the molar ratio of (a):(c) is 1:0 to 1:2.

8. A process according to claim 1, wherein the product of step (iv) is subjected one or more times to the steps of wet grinding, drying, and calcination.

9. A process according to claim 2, wherein y is in the range from 1 to 1.5.

10. A process according to claim 2, wherein the molar ratio of (a):(c) is 1:0 to 1:2.

11. A process according to claim 2, wherein the proportion of the starting materials is selected so as to result in a cathode material comprising 1 to 40% by mole of said inactive cathode material.

12. A process according to claim 2, wherein the proportion of the starting materials is selected so as to result in a cathode material comprising 3 to 30% by mole of said inactive cathode material.

13. A process according to claim 2, wherein in step (i) said melt or saturated aqueous solution is formed by first dissolving said manganese acetate tetrahydrate and optionally said acetate of Co, Ni, Ti, V or Fe in boiling water followed by introduction of said lithium hydroxide to the solution.

14. A process according to claim 2, wherein in step (ii) said melt or saturated aqueous solution is kept at a temperature in the range from 80 to 100° C. for a period of time from 10 minutes to 4 hours.

15. A process according to claim 2, wherein in step (iv) said calcination is carried out for a period of time of from 5 to 24 hours.

16. A process according to claim 2, wherein the product of step (iv) is subjected one or more times to the steps of wet grinding, drying, and calcination.

17. A lithium secondary battery comprising a cathode material produced according to the process of claim 1.

18. A lithium secondary battery comprising a cathode material produced according to the process of claim 2.

19. A process according to claim 1, wherein in step (ii) the melt or saturated aqueous solution is kept at a temperature in the range from 80 to 100° C. for a period of from 10 minutes to 4 hours.

20. A process according to claim 1, wherein in step (iv) the calcination is carried out for a period of from 5 to 24 hours.

* * * * *

UNITED STATES PATENT AND TRADEMARK OFFICE
CERTIFICATE OF CORRECTION

PATENT NO. : 5,948,565
DATED : September 7, 1999
INVENTOR(S) : Erik M. KELDER

It is certified that error appears in the above-identified patent and that said Letters Patent is hereby corrected as shown below:

Title page, [73] Assignee, change "ODENSE, DENMARK" to --ODENSE S. DENMARK--.

Signed and Sealed this

Twenty-eighth Day of November, 2000

Attest:

Q. TODD DICKINSON

*Attesting Officer*     *Director of Patents and Trademarks*